United States Patent
Kim et al.

(10) Patent No.: US 10,102,481 B2
(45) Date of Patent: Oct. 16, 2018

(54) HYBRID ACTIVE LEARNING FOR NON-STATIONARY STREAMING DATA WITH ASYNCHRONOUS LABELING

(71) Applicant: CONDUENT BUSINESS SERVICES, LLC, Dallas, TX (US)

(72) Inventors: Hyun Joo Kim, Monmouth Junction, NJ (US); Sriganesh Madhvanath, Pittsford, NY (US)

(73) Assignee: Conduent Business Services, LLC, Dallas, TX (US)

( * ) Notice: Subject to any disclaimer, the term of this patent is extended or adjusted under 35 U.S.C. 154(b) by 624 days.

(21) Appl. No.: 14/658,894

(22) Filed: Mar. 16, 2015

(65) Prior Publication Data

US 2016/0275411 A1    Sep. 22, 2016

(51) Int. Cl.
*G06N 5/04*    (2006.01)
*G06N 99/00*    (2010.01)
*G06F 17/30*    (2006.01)

(52) U.S. Cl.
CPC ..... *G06N 99/005* (2013.01); *G06F 17/30516* (2013.01); *G06F 17/30525* (2013.01); *G06N 5/04* (2013.01)

(58) Field of Classification Search
CPC ........................................................ G06N 5/04
USPC .................................................... 706/12, 45
See application file for complete search history.

(56) References Cited

U.S. PATENT DOCUMENTS

| | | |
|---|---|---|
| 7,356,187 B2 | 4/2008 | Shanahan et al. |
| 7,756,800 B2 | 7/2010 | Chidlovskii |
| 7,769,759 B1 | 8/2010 | Gartung et al. |
| 8,010,357 B2 | 8/2011 | Hakkani-Tur et al. |
| 8,311,957 B2 | 11/2012 | Kirshenbaum et al. |
| 8,612,373 B2 | 12/2013 | Chidlovskii |
| 8,684,264 B2 | 4/2014 | Yu et al. |
| 2012/0054184 A1 | 3/2012 | Masud et al. |
| 2012/0310864 A1 | 12/2012 | Chakraborty et al. |
| 2014/0277604 A1 | 9/2014 | Nixon et al. |

OTHER PUBLICATIONS

Chawla, et al., Learning From Labeled and Unlabeled Data: An Empirical Study Across Techniques and Domains, Journal of Artificial Intelligence Research 23, 2005, pp. 331-366. (Year: 2005).*

(Continued)

*Primary Examiner* — Wilbert L Starks
(74) *Attorney, Agent, or Firm* — Gibb & Riley, LLC

(57) ABSTRACT

A continuous electronic data stream of unlabeled data instances is received and fed into both a stream-based selection strategy and a pool-based selection strategy. The stream-based selection strategy is continuously applied to each of the unlabeled data instances to continually select stream-based data instances that are to be annotated. Additionally, the pool-based selection strategy is periodically applied to a pool of data obtained from the unlabeled data instances, to periodically select pool-based data instances that are to be annotated. Each time the pool-based selection strategy is applied, these methods automatically replace the stream-based data instances with the pool-based data instances. Also, these methods provide, on demand, access to allow a user to annotate the stream-based data instances and the pool-based data instances.

20 Claims, 7 Drawing Sheets

(56) References Cited

OTHER PUBLICATIONS http://burrsettles.com/pub/settles.activelearning.pdf, "Active Learning Literature Survey," Burr Settles, Computer Sciences Technical Report 1648,University of Wisconsin—Madison Updated on: Jan. 26, 2010, pp. 1-63.

http://www.gatsby.ucl.ac.uk/~chuwei/paper/Chu11,Unbiased.pdf, Chu et al., "Unbiased Online Active Learning in Data Streams" , Aug. 21-24, 2011, pp. 1-9.

Nathan Marz et al. "Big Data Principles and Best Practices of Scalable Realtime Data Systems", MEAP Edition Manning Early Access Program Big Data version 7, 2012, pp. 1-28.

Indre Žliobait et al., "Active Learning With Drifting Streaming Data", IEEE Transactions on Neural Networks and Learning Systems, vol. 25, No. 1, Jan. 2014, pp. 27-39.

Ryan Elwell, "Incremental Learning of Concept Drift in Nonstationary Environments", IEEE Transactions on Neural Networks and Learning Systems, vol. 22, No. 10, Oct. 2011, pp. 1517-1531.

Avrim Blum, "On-Line Algorithms in Machine Learning", Chapter 14 in "Online Algorithms: the state of the art", Fiat and Woeginger eds., LNCS #1442, 1998, pp. 1-20.

Joao Gama et al., "Learning with Drift Detection", Advances in Artificial Intelligence, pp. 286-295, 2004.

Alec Go et al., "Twitter Sentiment Classification using Distant Supervision", CS224N Project Report, Stanford, 2009, pp. 1-6.

Lambda architecture: design simpler, resilient, maintainable and scalable big data solutions, http://www.infoq.com/articles/lambda-architecture-scalable-big-data-solutions, Mar. 12, 2014, pp. 1-20.

Lambda architecture case stories, http://lambda-architecture.net/ 2014, pp. 1-3.

Batch-incremental versus instance-incremental learning in dynamic and evolving data processing, Jesse Read, Albert Bifet, Bernhard Pfahringer, and Geoff Holmes, in proceedings of the 11th international conference on advances in intelligent data analysis (IDA'12), 313-323, 2012.

\* cited by examiner

HYBRID ACTIVE LEARNING FOR NON-STATIONARY STREAMING DATA WITH ASYNCHRONOUS LABELING

BACKGROUND

Systems and methods herein generally relate to labeling data instances from data streams, and more particularly to supervised learning that uses trained machine classifiers.

Modern computerized systems automatically classify extremely large volumes of data quickly and efficiently using classification rules contained within items that are sometimes referred to as "models." Such models need to be trained to ensure that they are properly classifying the incoming data streams. Such training often involves selecting instances from the data stream and presenting such instances to a human operator for annotation or classification. This process is sometimes referred to as supervised learning.

It is more helpful to have the human operator annotate selected data instances for which there is a low classification confidence in supervised learning. This is because data instances that the current model finds difficult to classify (i.e., those having a low classification confidence) are the most useful data instances to obtain human input on, because they can provide the greatest incremental increase in classification accuracy. In view of this, the elements that select data instances to be annotated by humans generally select data instances that have a classification confidence that is below a classification confidence threshold, to allow the human annotations to provide the greatest incremental increase in classification accuracy for the classification model.

Supervised learning trains machine classifiers on hundreds or thousands of labeled instances. For example, supervised learning can be used for sentiment analysis in Twitter® products (Twitter, Inc., 1355 Market Street, Suite 900, San Francisco, Calif. 94103 USA) streaming data, where the Tweets® (data instances within the data stream) to be classified or labeled are selected by human annotators using keywords or data ranges. Because such labeling of data instances within the data streams is often performed by human experts, the labeled instances are difficult to obtain, time-consuming and/or expensive in many cases. The idea of active learning for the model is to achieve high accuracy with as few manually labeled instances as possible, thereby reducing the labeling cost. In general, active learning involves actively selecting instances for labeling from the available unlabeled data based on a well-defined strategy, as opposed to randomly selected instances.

There are a number of different strategies used for active learning, and most can be categorized into two approaches: 1) pool-based methods that select instances from an available pool of unlabeled instances and 2) stream-based methods that select samples from an incoming stream of unlabeled instances.

SUMMARY

Various exemplary methods herein receive a continuous electronic data stream of unlabeled data instances. The methods automatically feed the unlabeled data instances into both a stream-based selection strategy and a pool-based selection strategy. The stream-based and pool-based selection strategies automatically make decisions as to whether the unlabeled data instances should be annotated by the user (and the stream-based selection strategy and the pool-based selection strategy can have independent selection criteria). Generally, the stream-based selection strategy makes a selection decision on every one of the unlabeled data instances as they are received, but the pool-based selection strategy evaluates and ranks the unlabeled data instances from a pool of data before making a selection decision. Because of these differences, the stream-based selection strategy generally makes lower quality selections relative to the pool-based selection strategy.

Thus, the stream-based selection strategy is automatically and continuously applied to each of the unlabeled data instances to continually select stream-based data instances that are to be annotated, and such stream-based data instances are automatically stored in an electronic storage item. To the contrary, these methods automatically periodically apply the pool-based selection strategy to a pool of data obtained from the unlabeled data instances to periodically select pool-based data instances that are to be annotated. Each time the pool-based selection strategy is applied; these methods automatically replace the stream-based data instances in the storage item with the pool-based data instances. Further, the classification confidence threshold used by the stream-based selection strategy can be updated based on the classification confidence values produced during the application of the pool-based strategy.

Also, these methods provide (on demand, which can occur at unpredictable times) access to the storage item, so as to allow a user to annotate the stream-based data instances and the pool-based data instances that are currently maintained by the storage item at the time when the user accesses the storage item. In response, these methods receive annotations relating to the stream-based data instances and the pool-based data instances from the user (and this produces "annotated data instances").

These methods then automatically train the previous model with the annotated data instances to produce an updated model, and automatically replace the previous model with the updated model. Once the model is updated, these methods use the updated model to automatically label the unlabeled data instances to provide various analyses of the unlabeled data instances.

Various exemplary systems herein include (among other components) an input receiving a continuous electronic data stream of unlabeled data instances. A first processing element is operatively (meaning directly or indirectly) connected to the input. The first processing element automatically and continuously applies a stream-based selection strategy to each of the unlabeled data instances to continually select stream-based data instances to be annotated.

An electronic storage item is operatively connected to the first processing element and the electronic storage item stores the stream-based data instances. A second processing element is also operatively connected to the input and the electronic storage element. The second processing element can be a separate processing element from the first processing element, a different portion of a common processor (of which the first processing element is also a portion), or can be the same element as the first processing element. The second processing element automatically and periodically applies a pool-based selection strategy to a pool of data obtained from the unlabeled data instances to periodically select pool-based data instances to be annotated. The second processing element automatically replaces ones of the stream-based data instances in the storage item with the pool-based data instances, based on confidence values, each time the pool-based selection strategy is applied.

Again, the stream-based and pool-based selection strategies automatically make decisions as to whether the unlabeled data instances should be annotated by the user (and the stream-based selection strategy and the pool-based selection strategy can have independent selection criteria). Generally, the stream-based selection strategy makes a selection decision on every one of the unlabeled data instances as they are received, but the pool-based selection strategy evaluates and ranks the unlabeled data instances from a pool of data before making a selection decision. Because of these differences, the stream-based selection strategy generally makes lower quality selections relative to the pool-based selection strategy.

A graphic user interface is also operatively connected to the electronic storage element. The graphic user interface provides, on demand (which can occur at unpredictable times) access to the storage item allowing a user to annotate ones of the stream-based data instances and the pool-based data instances currently maintained by the storage item at the time when the user accesses the storage item. The graphic user interface receives annotations relating to the stream-based data instances and the pool-based data instances from the user to produce annotated data instances Additionally, a third processing element is operatively connected to the graphic user interface. The third processing element can be a separate processing element from the first and second processing elements, a different portion of a common processor (of which the first and second processing elements are also a portion), or can be the same element as the first processing element. The third processing element automatically trains the previous model with the annotated data instances to produce an updated model and automatically replaces the previous model with the updated model. Additionally, the third processing element automatically labels the unlabeled data instances using the updated model. The third processing element can also automatically update the classification confidence threshold used by the stream-based selection strategy based on the classification confidence values produced during the application of the pool-based strategy.

These and other features are described in, or are apparent from, the following detailed description.

BRIEF DESCRIPTION OF THE DRAWINGS

Various exemplary systems and methods are described in detail below, with reference to the attached drawing figures, in which.

DETAILED DESCRIPTION

Figure 1:
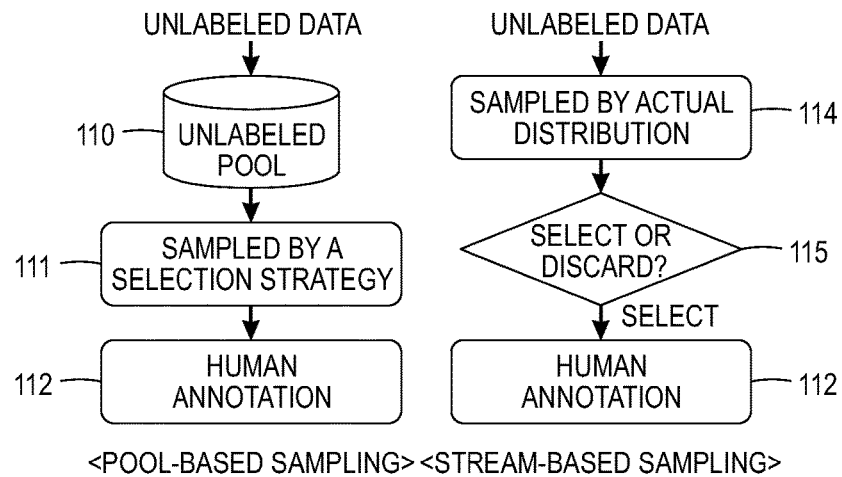
FIG. 1 is a flow diagram showing the pool-based and the stream-based processing.

As mentioned above, strategies used for active learning, can be categorized into two approaches: the pool-based methods (items 110-112 in FIG. 1); and the stream-based methods (items 114, 115, and 112 in FIG. 1). More specifically, FIG. 1 illustrates that a stream of unlabeled data is collected into an unlabeled pool 110, and the pool is sampled by a selection strategy 111. For example, the selection strategy 111 can select unlabeled data instances that would be most appropriate for manual annotation (e.g., those unlabeled data instances that would improve the automated labeling process the most). Then, the selected unlabeled data instances are presented to a human who supplies annotations (labels for the data instances) as shown in item 112. To the contrary, in the stream-based methods, rather than pooling the data, the stream-based methods sample the unlabeled data (e.g., by actual distribution) as it is received in item 114. Then, in item 115, the data is either selected or discarded based on criteria for human annotation. The labeling is subsequently provided by human annotation, as shown in item 112.

Thus, one difference between the stream-based and the pool-based active learning is that the former scans through the data sequentially and makes a query decision (i.e., whether or not to ask for a label) about each instance individually, whereas the latter evaluates and ranks the entire collection before selecting the best query (i.e., instance to be manually labeled). Measures of classification confidence or uncertainly are often used at the core of both types of strategies. For example, a common strategy used for the pool-based sample section is to select the most uncertain samples (i.e., those samples whose labels the classifier is least certain of) from the entire pool. Similarly, a common stream-based method is to select an input sample for labeling if the classifier's confidence is below a predetermined threshold.

Active learning enables supervised classifiers to learn using fewer labeled samples. The pool-based strategy selects instances to be labeled from the available pool of unlabeled data, by evaluating each instance and ranking it; while the stream-based strategy looks at every incoming instance and decides sequentially whether it wants that instance to be labeled or not. In many application scenarios (such as those involving sensor data, weather data, social media, voice calls, etc.) data keeps streaming in and changes over time. The stream-based strategies enable the ability to adapt the prediction model more quickly as the incoming data changes. However, the stream-based strategies tend to query more points than necessary, and tend to have poorer learning rates compared with the pool-based algorithms. On the other hand, since the pool-based strategies involve batch processing to select the best instances for labeling, the prediction model cannot be updated quickly.

The systems and methods herein provide a framework for hybrid active learning that integrates the pool-based and the stream-based strategies to harvest the benefits of both in a scenario where concept drift may be prevalent, and labeling is asynchronous. Additionally, the methods provide 1) prioritized (weighted) aggregation of selection to combine instances selected for labeling from the pool-based and the stream-based strategies, 2) confidence adaptation to adapt the confidence threshold used by the stream-based strategy with the value computed from the pool-based strategy, and 3) batch period adaptation to dynamically change the triggering pattern of the pool-based strategy based on detected concept drifts.

The systems and methods herein are useful with application scenarios where unlabeled data is incoming as a continuous stream, as is the case with many of data sources around us (e.g., sensor data, weather data, social network posts, calls, etc.). For such scenarios, in principle, either approach may be used for active learning: data samples may be stored to create a pool to select from, or selection decisions may be made about samples as they come in. While the pool-based approach is much more common, one can imagine settings where the stream-based approach is more appropriate, e.g., when memory or processing power may be limited, as with mobile and embedded devices, when the system is starting from scratch and there is no large pool of unlabeled samples available to begin with, or when the data is streaming in such large volumes that storing samples makes little practical sense. The pool-based learning methods allow the selection of the best samples to have labeled, and are well suited for batch training of machine classifiers, when there are no constraints on storage space or computation time. The stream-based methods may be combined with machine classifiers capable of incremental learning (e.g., learning from each labeled instance) to update the classifier's model frequently (assuming the availability of human annotators who can label samples soon after they are received).

When data is incoming as a continuous stream, the distribution of the target variable or class label over the input can change over time. Addressing such concept drift becomes a part of learning from the data stream. If concept drift is not addressed in time, the classifier's predicted class labels will show increasing error rate for new instances. While concept drift can be difficult to address completely, there have been attempts to "manage" concept drift in the context of active learning. For example, the pool-based active learning methods can manage concept drift to an extent by fading out old or irrelevant data and periodic retraining. The stream-based methods can address concept drift either passively by constantly retraining on more recent samples, or actively by trying to detect concept drift explicitly to trigger retraining.

Figure 2:
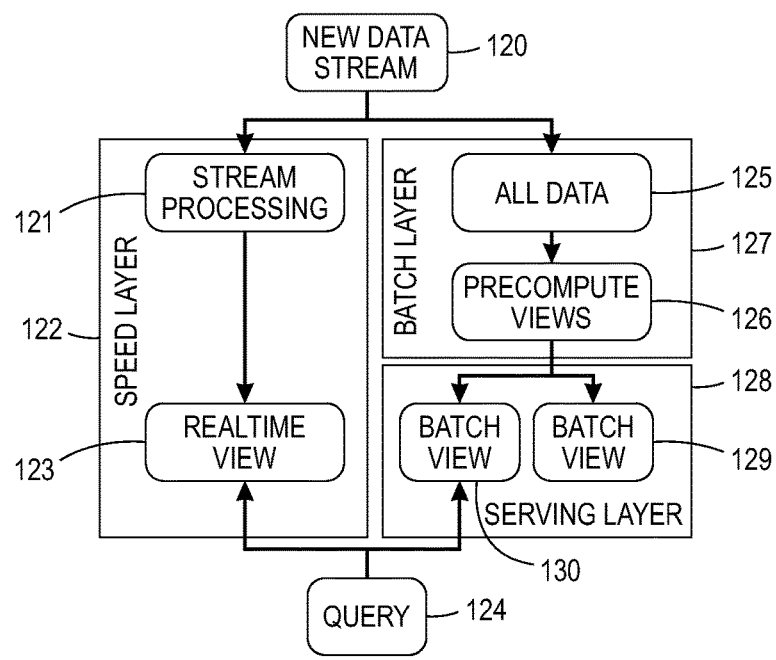
FIG. 2 is a flow diagram showing processing that uses integrating batch processing and real-time processing.

FIG. 2 illustrates processing that uses integrating batch processing and real-time processing. As shown in FIG. 2, this architecture includes three layers, a batch processing layer 127, a serving processing layer 128, and a speed processing layer 122. The batch layer 127 has a distributed large scale file system where an application's master dataset constantly grows, and provides large-scale computation over the entire dataset. This layer gathers all data 125 from the data stream 120 for a certain time period, and executes computation and updates result periodically (in the precompute views 126) since the processing typically takes time and is expensive. The serving layer 128 loads and exposes the batch views 129, 130 produced by the processing in item 126 in a data store for queries. Since the data 120 is a continuous stream and changes need to be reflected to the result in real-time, incoming data is ingested into speed layer 122 as well as the batch layer 127, and the speed layer 122 computes data in real time (e.g., the stream processing 121 that produces the real-time view 123) and manages result between batch computations. Once a batch computation is performed on the data by the batch layer 127, the result for the same data in the speed layer 122 is discarded. Therefore, the queries 124 from the user end are merged results from both the speed layer 122 and the serving layer 128 to provide a complete view.

With the systems and methods herein, different processing is performed in the batch layer 127 and the speed layer 122. Also, the systems and methods herein are not limited to a certain processing or storage system; and instead, the systems and methods herein integrate different active learning strategies efficiently to maximize benefits for active learning.

Figure 3:
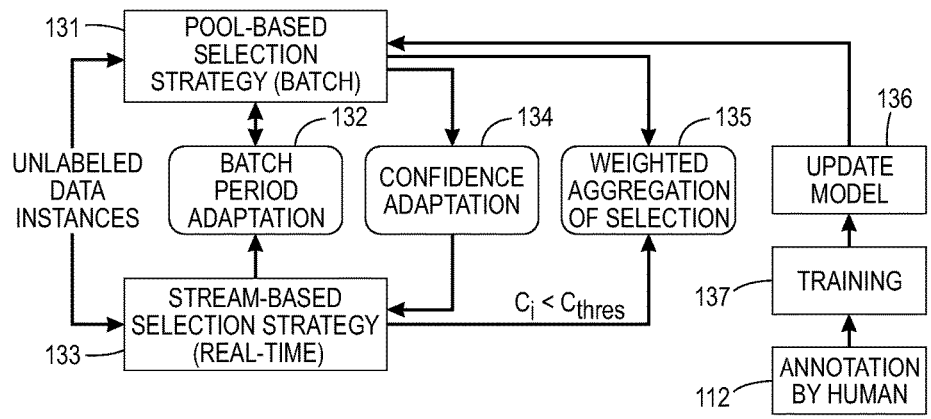
FIG. 3 is a flow diagram showing integrating the pool-based sampling strategy and the stream-based sampling strategy of active learning.

FIG. 3 shows an example of integrating the pool-based sampling strategy and the stream-based sampling strategy of active learning using systems and methods herein. The incoming data stream of unlabeled instances is fed into both the pool-based 131 and the stream-based 133 active learning segments of the framework simultaneously. In this framework, the methods use the pool-based strategy for the batch processing segment 131 and the stream-based selection strategy for the real-time processing segment 133. The provided framework is largely independent of the choice of specific strategies for the pool-based 131 and the stream-based 133 active learning. For the purposes of illustration, it will be assumed that the simple confidence-based selection strategies mentioned earlier are used for both; however, those ordinarily skilled in the art would understand that any selection strategy could be used by the modules herein.

The methods divide the time axis into equal time periods (143 in FIG. 4) demarcated by $T_0, T_1, T_2, \ldots$ at each $T_i$, the pool-based selection 131 is triggered. Thus, the pool-based selection strategy 131 runs periodically and selects the set of data instances to be labeled from the available pool, while the stream-based selection strategy 133 runs on each individual incoming data instance and makes a decision as to whether it should be labeled or not.

The methods assume that the annotation is an asynchronous process that comes back at some unpredictable time t and asks for n instances to label. This would be the case when there are (one or more) annotators who can do some labeling in their spare time (as is the case with many applications). Therefore, the framework is able to provide on demand, a set of instances for labeling. The n selected unlabeled data instances are annotated in item 112, the model is trained (item 137) with the annotated data instances and updated (item 136), and the updated model is thereafter used by the system.

Here, the methods assume that the classifier is only capable of batch retraining, not incremental updates to the model. This implies that training of the classifier is explicitly triggered using a labeled training set, and when completed, the newly trained model replaces the previous model. In addition to the foregoing, FIG. 3 illustrates weighted (prioritized) aggregation of selections 135, confidence adaptation 134, and batch period adaptation 132.

With respect to the weighted or prioritized aggregation of selection 135 shown in FIG. 3, as noted above, the pool-based selection strategy 131 gathers unlabeled data and runs periodically on the historical data, while the stream-based selection strategy 133 selects data to query in real-time. Therefore, at time t when the request for n samples to label is received, the candidates to be labeled in the weighted aggregation of selection 135 will be the union S of the set of selected data from the latest run of the pool-based selection strategy 131 and the selected data from the stream-based selection strategy 133 after the latest run of the pool-based selection strategy to t.

Figure 4:
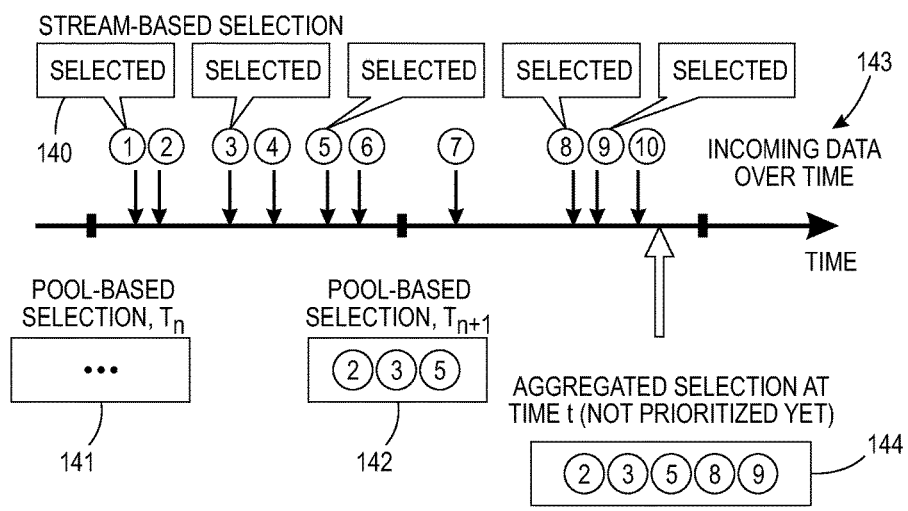
FIG. 4 is a schematic diagram illustrating selected incoming data processes.

FIG. 4 shows an example of aggregated selection 135 from the pool-based strategy 131 and the stream-based strategy 133. Note, that the aggregated selection S is not prioritized yet, as shown by item 144, and the selection from the stream-based strategy 140 for a certain period may be different from the selection from the pool-based strategy 141, 142. Whenever the pool-based strategy 141 runs, the selection from the stream-based strategy 140 up to that point is discarded because the methods assume that selection made using the pool-based strategy is better due to its ability to look at all samples together rather than one sample at a time.

Prioritizing the candidate dataset S is performed especially when the annotation is limited by the lack of resources, such as budget to pay for annotation, the number of experts, or time constraints, and so on. If the annotation resources are available, the aggregated set S of selected data may be completely annotated. However, if not, it requires selecting the n—best among the aggregated selection that can improve the accuracy of model faster.

Classifiers built for streaming data often have to deal with concept drift. Intuitively therefore, a data instance with a lower classification confidence and a newer timestamp should have a higher chance to be selected for labeling. Accordingly, the systems and methods herein define a priority function for each data instance i, as in equation (1) where $U_i$ is uncertainty, set to $1-C_i$, where confidence, $C_i$, is a value in [0, 1] obtained from the classifier, $R_i$ is the normalized recency of a data instance over the time window over all the sampled instances and its value is in [0, 1]. $\delta$ is a weight to adjust the sampling ratio between uncertainty and recency. Also, the systems and methods herein can adjust sampling between the stream-based selection and the pool-based selection because the larger $\delta$ has higher chance to select more data instances from the pool-based selection. Note, that the time window, $T_{window}$, is to normalize the timestamp of the individual data instance and is different from the sliding window in the pool-based strategy because $T_{window}$ should include the times for data instances from the streaming-based strategy as well, and they are unknown at the moment when the pool-based strategy returns a set of instances to be labeled. Therefore, $T_{window}$ includes the time frame until the next pool-based strategy runs in addition to the sliding window. For example, if the pool-based strategy runs at each time period, $T_1$, $T_2$, $T_3$ and so on, $T_{window}$ can be set as $T_2-T_0$ at $T_1$ and $T_3-T_1$ at $T_2$, respectively. If the pool-based strategy runs over multiple periods, such as $[T_0, T_2]$ at $T_2$ and $[T_1, T_3]$ at $T_3$, then $T_{window}$ can be set as $[T_0, T_3]$ at $T_2$ and $[T_1, T_4]$ at $T_3$, and so on. $T_{start}$ is the starting time of a sampling period and $T_{i\_arrive}$ is the time that data instance i arrives. The higher the priority is the higher chance it would have to be selected for labeling.

$$P_i = \delta U_i + (1-\delta)R_i, \text{ where} \quad (1)$$

$$R_i = \frac{(T_{i\_arrive} - T_{start})}{T_{window}}.$$

When the pool-based strategy selects a new set of data instances to be labeled, the previously selected data instances waiting for labeling in the aggregated list but not yet labeled are discarded, then the priority for each new data instance is calculated and stored in the aggregated list in descending order of priority, creating the weighted aggregation list in item 135. Whenever the stream-based strategy selects an incoming data instance to be labeled, its priority is calculated and inserted into the appropriate position of the aggregated list. When n samples are requested for annotation, the n data instances having the highest priority from the weighted aggregation list are returned.

Note, that a data instance having higher uncertainty may not have higher priority if its timestamp is not recent enough. Giving priority to newer samples allows the systems and methods herein to deal with concept drift in a passive manner. The extent to which the system exhibits this behavior may be modified by changing the $\delta$ parameter. In addition, the pool-based sample selection may be executed on different choices of pools based on the application scenario and the need to address concept drift. For instance, the pool may be defined as the data received during the most recent time period. However it may also run on data which are accumulated over multiple periods, defined as a sliding window. For example, it runs on data accumulated in $[T_8, T_{10}]$ at time $T_{10}$, and data in $[T_9, T_{11}]$ at time $T_{11}$, and so on. Finally, it may also be run on all historical data $[T_0, T_{10}]$ at time $T_{10}$, $[T_0, T_{11}]$ at time $T_{11}$. This assumes a relatively stable concept and the ability to store large amounts of historical data.

With respect to confidence adaptation 134 shown in FIG. 3, the stream-based selection strategy makes a greedy decision whether an incoming instance should be selected for labeling, by comparing its classification confidence value against a predefined confidence threshold, $C_{thres}$. In order to reflect the most recent data changes, the confidence adaptation 134 updates $C_{thres}$ periodically using the selection from the pool-based strategy (instead of using a static threshold), because the pool-based strategy provides stable and better selection due to its ability to investigate all data instances from the pool. Whenever the pool-based strategy selects a set of k data instances, $C_{thres}$ is replaced with their maximum classification confidence, $C_{max}$.

$$C_{thres}=C_{max},$$

$$\text{where } C_{max}=\max(C_1, C_2, \ldots, C_k) \quad (2)$$

With respect to the batch period adaptation 132 shown in FIG. 3, the pool-based selection strategy runs periodically and the duration of each period is typically static. However, the systems and methods can adapt the batch period when concept drift is detected. This allows more data instances in the changing data distribution to be selected for labeling so as to update the classifier more quickly. The batch period, $D_i$, is adapted as in equation (3).

$$Di=\max((1-\alpha)D_{i-1}, D_{min}), 0\leq\alpha\leq1, \text{ if concept drift}$$

$$\min((1+\beta)D_{i-1}, D_{max}), 0\leq\beta\leq1, \text{ otherwise.} \quad (3)$$

Thus, in batch period adaptation 132, the next batch period is reduced if concept drift is detected and increased otherwise. $\alpha$ and $\beta$ are predefined coefficients to decide the decreased or increased amount of time. They may be constants to adjust the batch period by a static time amount, or may be variable by a function. The systems and methods herein bound the batch period by $D_{min}$ and $D_{max}$ so as not to increase nor decrease the period indefinitely.

The above assumes the possibility of detection of concept drift soon after it happens. This is typically feasible in an online learning scenario wherein the true label for each incoming sample becomes available soon after the prediction, allowing the continuous monitoring of classification error rate. However, it may not be feasible to detect concept drift immediately since labeling occurs asynchronously at arbitrary time, T and involves an arbitrary number of samples n that are by design difficult samples and not representative of the population. To detect concept drift actively in this scenario, a separate, parallel sampling and labeling scheme can be applied. In this separate scheme, m samples are selected additionally and randomly from the pool periodically and all m instances are labeled. Then, an error rate is calculated, with true labels for the m instances, and used to detect concept drift (as an increase in error rate over time), enabling batch period to be adapted as provided above.

Note, that such additional sampling requires additional effort and cost. In the absence of such active detection of concept drift, the system and methods herein provide a number of mechanisms for passive management of concept drift (such as an adaptive sliding window in the pool-based strategy) so as to fade out old data instances, and incorporation of the normalized age factor in the priority function used for final sample selection.

In one example, an arbitrary number of Tweets® instances for labeling are selected from the pool of unlabeled samples by human annotators using search keywords or date ranges when there are available resources for annotation, and the classifier model is updated when the number of newly labeled instances exceeds a certain threshold (in batch mode). In this scenario, active learning would be helpful to improve the accuracy of the sentiment classifier using fewer labeled instances. Since the content of Tweets® is highly variable, sentiment of incoming data and its distribution can change over time. This calls for not only detecting concept drift in time but also stable and efficient methods for learning.

Figure 5:
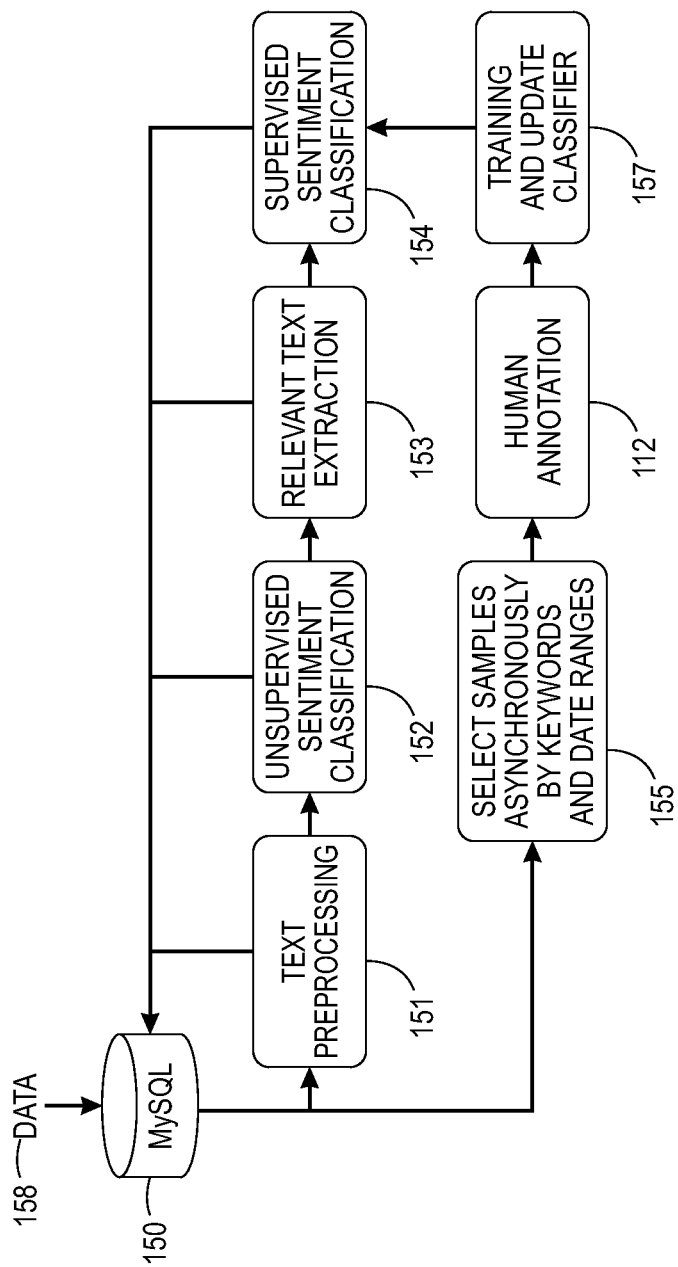
FIG. 5 is a flow diagram illustrating an exemplary classification process from data instances.

FIG. 5 shows an exemplary classification process from data instances that are Twitter® Tweets®, mentioned above. Tweets® 158 are continuously streaming in and filtered based on predefined keywords. All the Tweets® 158 are stored into a database 150 (e.g., MySQL) first, and triggered periodically to classify sentiments. In this example, the systems and methods herein first perform text preprocessing 151 to tokenize Tweet® sentences into words, and then execute unsupervised sentiment classification 152 using a library on the tokenized words. In this example, the systems and methods herein count the number of words for negative, neutral, and positive, and then decide the sentiment of a Tweet® by its scoring. The most relevant text is extracted from the Tweet® in item 153, and then supervised sentiment classification 154 runs on the relevant text. The results of each stage are stored back to the database 150.

In some situations, there is no dependency between the unsupervised sentiment classification 152 and the supervised sentiment classification 154; however, in this example, the unsupervised sentiment classification 152 proceeds ahead of the supervised sentiment classification 154 because the result of the unsupervised sentiment classification 152 becomes one of the features for the supervised sentiment classification 154. The classifier of the supervised sentiment classification 154 is trained whenever it gathers enough annotated data, as shown in item 157. In this example, the annotation 112 is requested at arbitrary times asynchronous to the classification process, and samples for annotation are selected by date range or keyword search in item 155.

Figure 6:
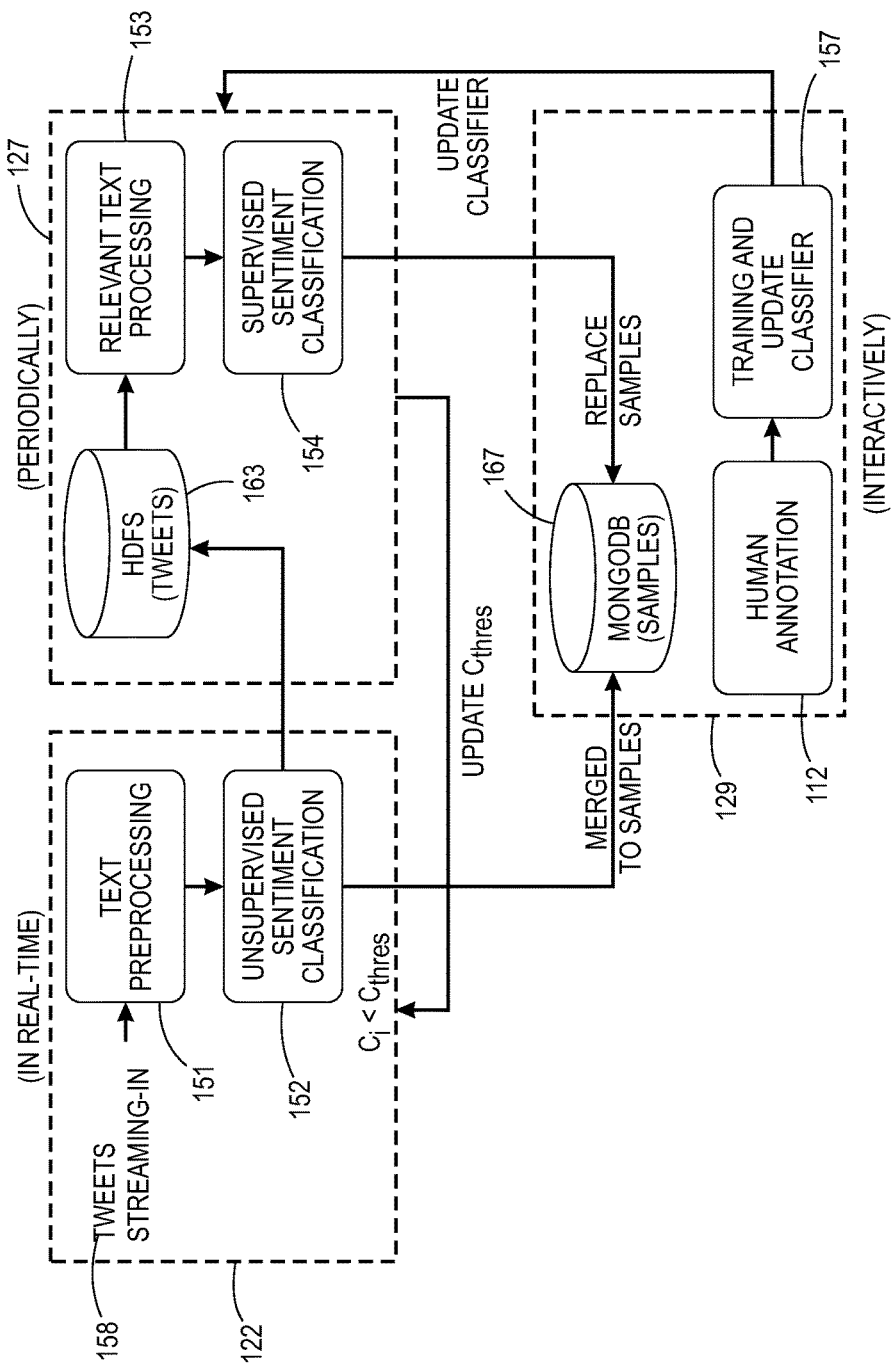
FIG. 6 is a flow diagram illustrating the application of hybrid active learning with pool-based and stream-based selection strategies.

The systems and methods herein apply hybrid active learning with the pool-based and the stream-based selection strategies for better sampling and improving accuracy, as shown in FIG. 6 (which illustrates the deployment architecture of hybrid active learning). As shown in FIG. 6, the systems and methods herein include three layers, where the speed layer 122 manages streaming computation in real time, the batch layer 127 manages batch computations periodically, and the serving layer 129 stores a real-time view from the speed layer 122 and a batch view from the batch layer 127 to interact with user queries (sampling requests for annotation).

As noted above, the systems and methods herein can use unsupervised sentiment classification 152 for the stream-based selection strategy 122 and supervised sentiment classification 154 for pool-based selection strategy 127. Since the stream-based selection 122 makes sampling decision on the fly, the systems and methods herein deploy unsupervised sentiment classification 152 to the speed layer 122. Therefore, Tweets® 158 stream into the speed layer 122, text preprocessing 151 is performed to tokenize Tweet® sentences into words, and the sentiment of each tweet is predicted using unsupervised sentiment classification 152. Then, the confidence of the Tweet® output by the unsupervised sentiment classification 152 is calculated and compared with a first confidence threshold. If the confidence value of the Tweet® output by the unsupervised sentiment classification 152 is less than the first confidence threshold, the Tweet® is selected as a sample and forwarded to a sample database 167 (e.g., MongoDB) to store.

Also, the Tweets® 158 that execute the unsupervised sentiment classification 152 are gathered and wrapped as a file periodically to upload to a file system 163 within the pool-based selection strategy 127. The most relevant text is extracted from the Tweet® in item 153 in the pool-based selection strategy 127, and then supervised sentiment classification 154 is run periodically over the entire dataset to predict sentiments. Then, the confidence of the Tweet® output by the supervised sentiment classification 154 is calculated and compared with a second confidence threshold. If the confidence value of the Tweet® output by the supervised sentiment classification 154 is less than the second confidence threshold, the Tweet® replaces the existing samples in the database 167.

Note, that the samples in database 167 are often replaced when the pool-based selection 127 runs because the pool-based 127 selects better samples than the stream-based strategy 122, due to evaluating the entire dataset. The samples collected in database 167 are prioritized using equation (1), and therefore, the human annotator can label samples which have higher priority first in item 112.

The classifier for the supervised sentiment classification 154 is trained with labeled data periodically (by item 157) and applied back to the pool-based selection (as shown by the return arrow in FIG. 6). Also, after the pool-based selection 127 runs, the pool-based selection 127 updates the confidence threshold to the maximum confidence obtained from the pool (as shown by the return arrow in FIG. 6). Therefore, the stream-based selection 122 can adjust the first confidence threshold as reflected from the pool-based selection 127.

Thus, the methods described above provide a framework and method for hybrid active learning, which integrates the pool-based strategy and the stream-based strategy to harvest the benefits of both in a scenario where concept drift may be prevalent, and labeling is asynchronous. The methods provided prioritized aggregation of selection from both selection strategies, confidence adaptation to the adjust confidence threshold for the stream-based selection reflected by the pool-based selection, and batch period adaptation to change the triggering pattern of the pool-based selection when concept drift is detected.

Figure 7:
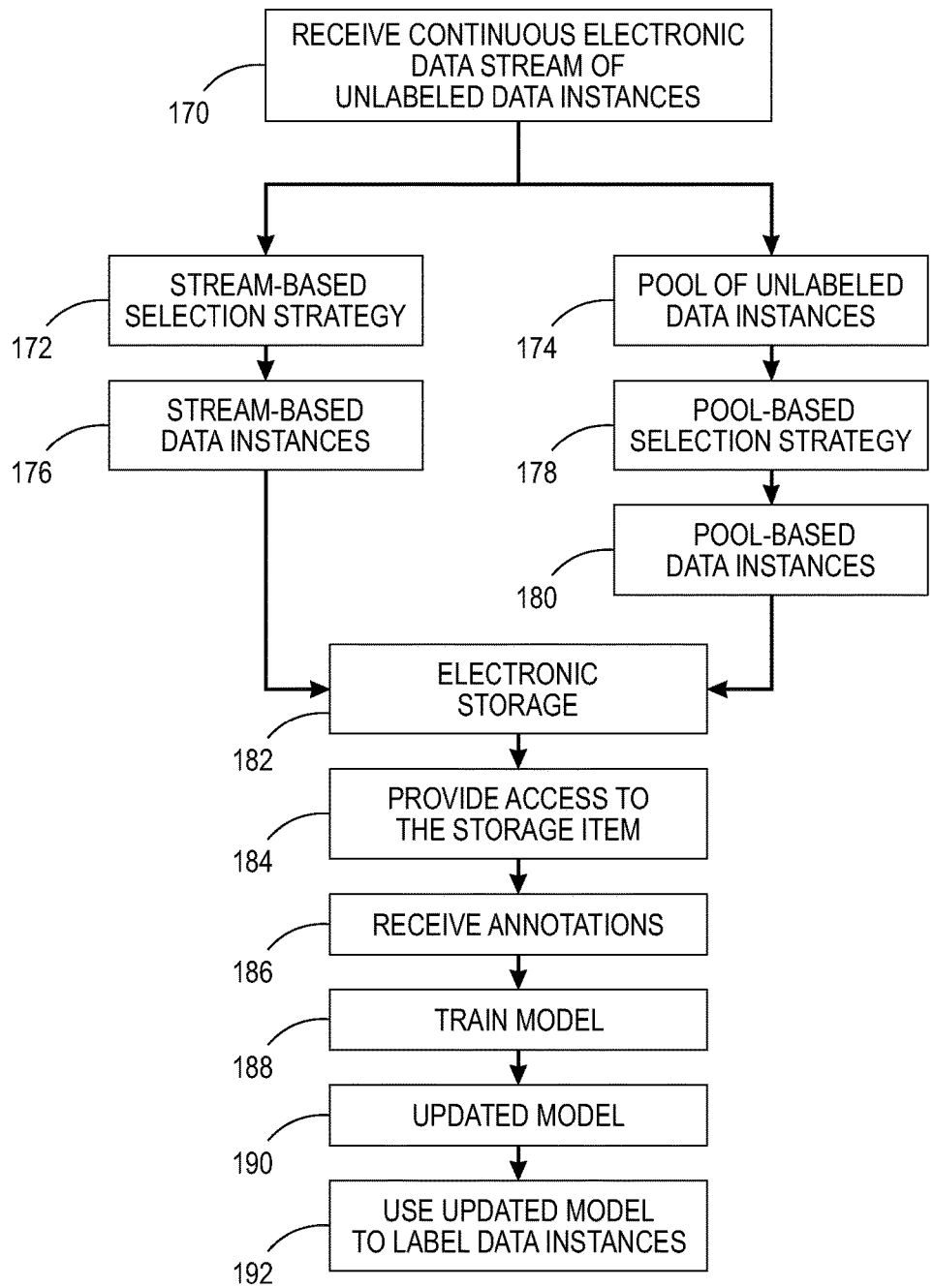
FIG. 7 is a flow diagram of various methods herein.

FIG. 7 is flowchart illustrating exemplary methods herein. In item 170, these methods receive a continuous electronic data stream of unlabeled data instances. The methods automatically feed the unlabeled data instances into both a stream-based selection strategy 172 and a pool-based selection strategy 178.

The stream-based 172 and pool-based 178 selection strategies automatically make decisions as to whether the unlabeled data instances should be annotated by the user (and the stream-based selection strategy and the pool-based selection strategy can have independent selection criteria). Generally, the stream-based selection strategy 172 makes a selection decision on every one of the unlabeled data instances as they are received and without reference or comparison to any other data instance, but the pool-based selection strategy 178 evaluates and ranks the unlabeled data instances from a pool of data 174 before making a selection decision. The pool-based strategy 178 continually accumulates (into the pool 174) all the data instances received since the last time the pool-based selection strategy was applied. The pool-based strategy 178 is able to compare and rank different data instances that are in the pool 174 during the selection process, providing greater accuracy during the selection process. After the pool-based strategy 178 has been applied, the pool 174 is emptied (e.g., currently existing data instances are deleted from the pool 174) so that the pool 174 can start accumulating new data instances. Because of these differences, the stream-based selection strategy 172 generally makes lower quality selections relative to the pool-based selection strategy 178.

Thus, the stream-based selection strategy 172 is automatically and continuously applied to each of the unlabeled data instances to continually select stream-based data instances 176 that are to be annotated, and such stream-based data instances are automatically stored in an electronic storage item 182. To the contrary, these methods only periodically apply the pool-based selection strategy 178 to the pool of data 174, obtained from the unlabeled data instances, to periodically select pool-based data instances 180 that are to be annotated. Each time the pool-based selection strategy is applied, these methods automatically replace the existing stream-based data instances in the storage item 182 with the selected pool-based data instances 180. Note, that in some instances (for example, where are the pool-based selection strategy 178 produces unusually low confidence results compared to the stream-based selection strategy 172, etc.) the stream-based data instances in the storage item 182 may not be replaced with the pool-based data instances 180. Further, the classification confidence threshold used by the stream-based selection strategy can be updated based on the classification confidence values produced during the application of the pool-based strategy 178.

Also, these methods provide (on demand, which can occur at unpredictable times) access to the storage item 184, so as to allow a user to annotate the stream-based data instances and the pool-based data instances that are currently maintained by the storage item 182 (e.g., those data instances that are in the electronic storage 182 at the time when the user accesses the storage item). In response, these methods receive annotations 186 relating to the stream-based data instances and the pool-based data instances from the user (and this produces "annotated data instances"). Once the data instances within the electronic storage 182 are annotated by the user, they are removed from the electronic storage 182 (e.g., deleted) so that the electronic storage only maintains those data instances that are yet to be annotated (e.g., selected, but unannotated data instances).

These methods then automatically train the previous model with the annotated data instances 188 to produce an updated model, and automatically replace the previous model with the updated model 190. Once the model is updated, these methods use the updated model to automatically label all incoming unlabeled data instances 192 to provide various analyses of the incoming data stream of unlabeled data instances.

The hardware described herein plays a significant part in permitting the foregoing method to be performed, rather than function solely as a mechanism for permitting a solution to be achieved more quickly, (i.e., through the utilization of a computer for performing calculations). As would be understood by one ordinarily skilled in the art, the processes described herein cannot be performed by human alone (or one operating with a pen and a pad of paper) and instead such processes can only be performed by a machine (especially when the volume of data being processed, and the speed at which such data needs to be evaluated is considered). For example, if one were to manually attempt to perform the classification processing performed by the models discussed above, the manual process would be sufficiently inaccurate and take an excessive amount of time so as to render the manual classification results useless. Specifically, processes such as receiving electronic data streams, updating automated models, using the models to automatically label data instances, electronically storing data instances, etc., requires the utilization of different specialized machines, and humans performing such processing would not produce useful results because of the time lag, inconsistency, and inaccuracy humans would introduce into the results.

Therefore, for example, the processes of receiving electronic data streams, updating automated models, using the models to automatically label data instances, electronically storing data instances, performed by the devices cannot be performed manually (because it would take decades or lifetimes) and such are integral with the processes performed by methods herein. Further, such machine-only processes are not mere "post-solution activity" because the electronic data is subjected to different selection processes and such data is further utilized to update an automated model for assigning labels to unlabeled data instances. Similarly, the electronic transmissions of such data utilize special-purpose equipment (telecommunications equipment, routers, switches, etc.) that is distinct from a general-purpose processor. Also, the data transmission is integral with the process performed by the methods herein, and is not mere post-solution activity, because the steam of data instances are used throughout the methods, and these methods herein rely upon such data streams to update the model, and cannot be performed without such electronic data streams. In other words, these various machines are integral with the systems and methods herein because the methods cannot be performed without the machines (and cannot be performed by humans alone).

Additionally, the systems and methods herein solve many highly complex technological problems. For example, as mentioned above, in situations involving sensor data, weather data, social media, voice calls, etc., the data keeps streaming in and changes over time and, while stream-based strategies enable the ability to adapt the prediction model more quickly, such stream-based strategies tend to query more points than necessary, and have poorer learning rates compared with the pool-based algorithms. On the other hand, since the pool-based strategies involve batch processing to select the best instances for labeling, the prediction model cannot be updated quickly. Systems and methods herein solve these technological problems by combining stream-based and pool-based strategies to provide the benefits of each different strategy, while at the same time avoiding the disadvantages of each strategy by using constantly updated confidence values used to selectively replace the data instances selected for annotation. Thus, the systems and methods herein only ask the user to annotate selected unlabeled data instances that will make high-impact, high-quality changes to the model (while at the same time providing quick updates to the model through the constant stream-based strategy). This reduces the amount of electronic storage that a provider must maintain, and also reduces the technological challenges of having users annotate unlabeled data instances that will provide high-quality changes to the labeling model. By granting such benefits, the systems and methods herein reduce the amount and complexity of hardware and software needed to be purchased, installed, and maintained, thereby solving a substantial technological problem that providers experience today.

Similarly, with respect to the users, the systems and methods herein additionally solve many technological problems by having users annotate only those unlabeled data instances that will provide high-quality changes to the labeling model. By limiting the unlabeled data instances that the user is asked to annotate, while at the same time providing quick updates to the model through the constant stream-based strategy, the systems and methods herein substantially reduce the burden on the user and on the hardware (freeing processing and storage resources for other tasks, or reducing the need to purchase, installation, and upkeep of such resources). In other words, because the user does not maintain any personal or financial information on the user device, the technology of the user device can be substantially simplified, thereby reducing cost, weight, size, etc., and providing many substantial technological benefits to the user.

Figure 8:
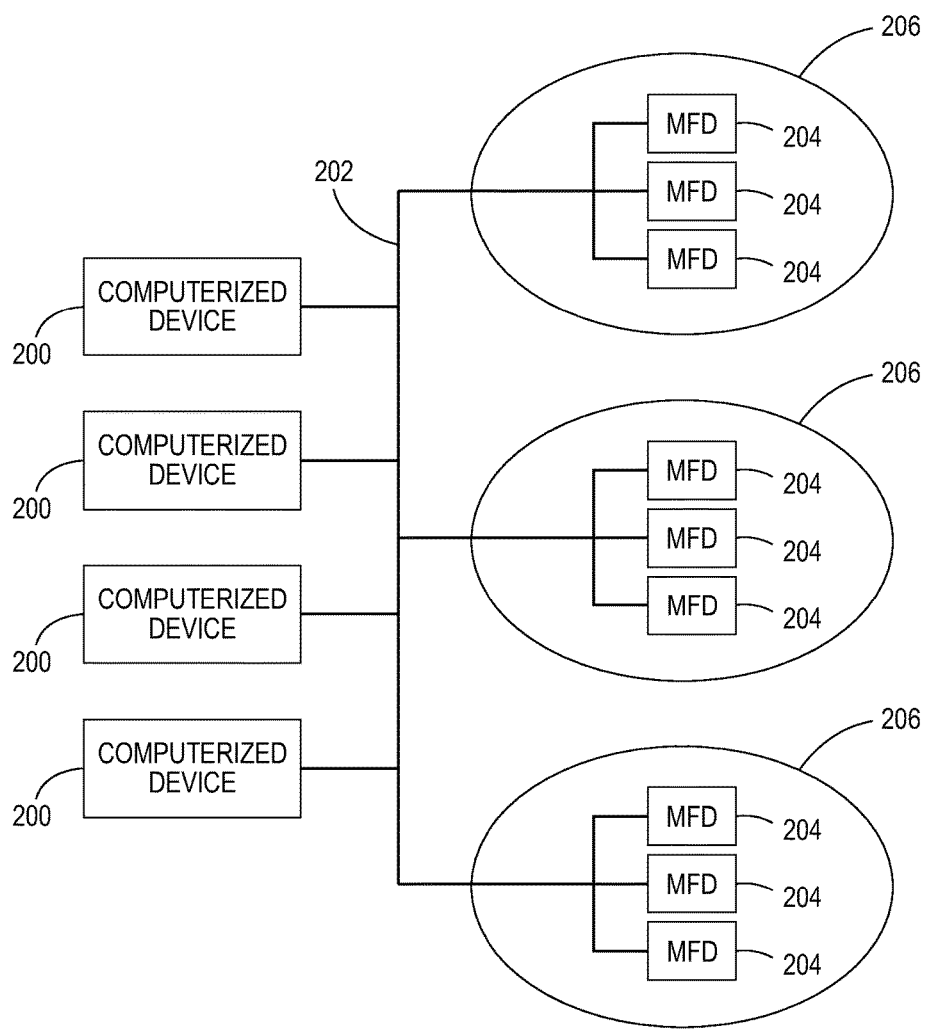
FIG. 8 is a schematic diagram illustrating systems herein.

As shown in FIG. 8, exemplary systems and methods herein include various computerized devices 200, 204 located at various different physical locations 206. The computerized devices 200, 204 can include servers, transmission devices, personal computers, etc., and are in communication (operatively connected to one another) by way of a local or wide area (wired or wireless) network 202.

Figure 9:
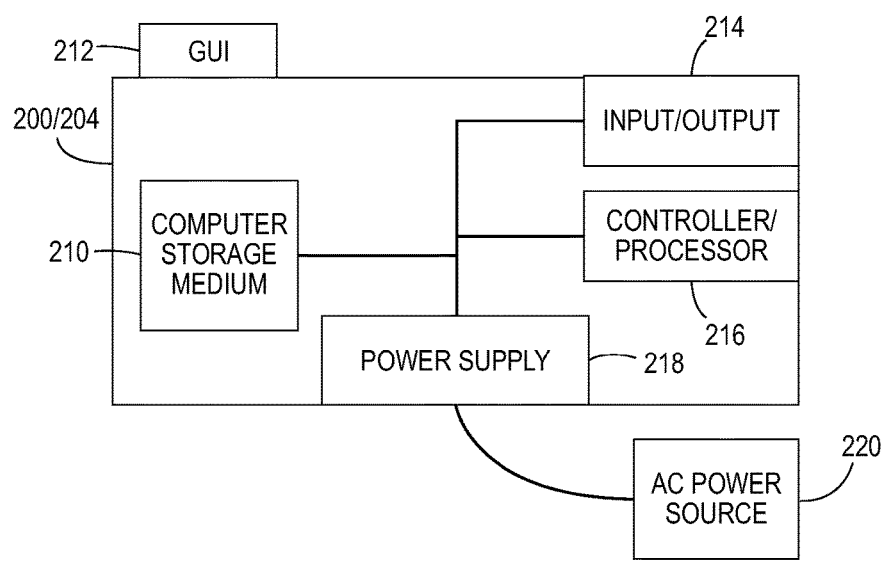
FIG. 9 is a schematic diagram illustrating devices herein.

FIG. 9 illustrates a computerized device 200/204, which can be used with systems and methods herein and can comprise, for example, a print server, a personal computer, a portable computing device, etc. The computerized device 200/204 includes a controller/tangible processor 216 and a communications port (input/output) 214 operatively connected to the tangible processor 216 and to the computerized network 202 external to the computerized device 200. Also, the computerized device 200/204 can include at least one accessory functional component, such as a graphical user interface (GUI) assembly 212. The user may receive messages, instructions, and menu options from, and enter instructions through, the graphical user interface or control panel 212.

The input/output device 214 is used for communications to and from the computerized device 200/204 and comprises a wired device or wireless device (of any form, whether currently known or developed in the future). The tangible processor 216 controls the various actions of the computerized device. A non-transitory, tangible, computer storage medium device 210 (which can be optical, magnetic, capacitor based, etc., and is different from a transitory signal) is readable by the tangible processor 216 and stores instructions that the tangible processor 216 executes to allow the computerized device to perform its various functions, such as those described herein. Thus, as shown in FIG. 9, a body housing has one or more functional components that operate on power supplied from an alternating current (AC) source 220 by the power supply 218. The power supply 218 can comprise a common power conversion unit, power storage element (e.g., a battery, etc), etc.

Such devices are special-purpose devices distinguished from general-purpose computers because such devices include specialized hardware, such as: specialized processors 226 (e.g., containing specialized filters, buffers, application specific integrated circuits (ASICs), ports, etc.) that are specialized for phone communications, for use with cellular networks, etc.; specialized graphic user interfaces 212 (that are specialized for reduced power consumption, reduced size, antiglare, etc.); antenna 228 (that are specialized for phone communications, for use with cellular networks, etc.); specialized converters; GPS equipment 224; cameras and optical devices 222 (that are specialized for obtaining images with camera components); specialized batteries; specialized protective cases for use in harsh environments; etc.

Thus, various exemplary systems herein include (among other components) an input 214 receiving a continuous electronic data stream of unlabeled data instances. A first processing element 216 is operatively connected to the input 214. The first processing element 216 automatically and continuously applies a stream-based selection strategy to each of the unlabeled data instances to continually select stream-based data instances to be annotated.

An electronic storage item 210 is operatively connected to the first processing element 216. The electronic storage item 210 stores the stream-based data instances. A second processing element 216 is also operatively connected to the input 214 and the electronic storage element. The second processing element 216 can be a separate processing element 216 from the first processing element 216, a different portion of a common processor (of which the first processing element 216 is also a portion), or can be the same element as the first processing element 216. The second processing element 216 automatically and periodically applies a pool-based selection strategy to a pool of data obtained from the unlabeled data instances to periodically select pool-based data instances to be annotated. The second processing element 216 automatically replaces ones of the stream-based data instances in the storage item 210 with the pool-based data instances each time the pool-based selection strategy is applied.

Again, the stream-based and pool-based selection strategies automatically make decisions as to whether the unlabeled data instances should be annotated by the user (and the stream-based selection strategy and the pool-based selection strategy can have independent selection criteria). Generally, the stream-based selection strategy makes a selection decision on every one of the unlabeled data instances as they are received, but the pool-based selection strategy evaluates and ranks the unlabeled data instances from a pool of data before making a selection decision. Because of these differences, the stream-based selection strategy generally makes lower quality selections relative to the pool-based selection strategy.

A graphic user interface 212 is also operatively connected to the electronic storage element. The graphic user interface 212 provides, on demand (which can occur at unpredictable times) access to the storage item 210 allowing a user to annotate ones of the stream-based data instances and the pool-based data instances currently maintained by the storage item 210 at the time when the user accesses the storage item 210. The graphic user interface 212 receives annotations relating to the stream-based data instances and the pool-based data instances from the user to produce annotated data instances Additionally, a third processing element 216 is operatively connected to the graphic user interface 212. The third processing element 216 can be a separate processing element 216 from the first and second processing element 216s, a different portion of a common processor (of which the first and second processing element 216s are also a portion), or can be the same element as the first processing element 216. The third processing element 216 automatically trains the previous model with the annotated data instances to produce an updated model and automatically replaces the previous model with the updated model. Additionally, the third processing element 216 automatically labels the unlabeled data instances using the updated model. The third processing element 216 can also automatically update the classification confidence threshold used by the stream-based selection strategy based on the classification confidence values produced during the application of the pool-based strategy.

While some exemplary structures are illustrated in the attached drawings, those ordinarily skilled in the art would understand that the drawings are simplified schematic illustrations and that the claims presented below encompass many more features that are not illustrated (or potentially many less) but that are commonly utilized with such devices and systems. Therefore, applicants do not intend for the claims presented below to be limited by the attached drawings, but instead the attached drawings are merely provided to illustrate a few ways in which the claimed features can be implemented.

Many computerized devices are discussed above. Computerized devices that include chip-based central processing units (CPU's), input/output devices (including graphic user interfaces (GUI), memories, comparators, tangible processors, etc.) are well-known and readily available devices produced by manufacturers such as Dell Computers, Round Rock Tex., USA and Apple Computer Co., Cupertino Calif., USA. Such computerized devices commonly include input/output devices, power supplies, tangible processors, electronic storage memories, wiring, etc., the details of which are omitted herefrom to allow the reader to focus on the salient aspects of the systems and methods described herein. Further, the terms automated or automatically mean that once a process is started (by a machine or a user), one or more machines perform the process without further input from any user.

It will be appreciated that the above-disclosed and other features and functions, or alternatives thereof, may be desirably combined into many other different systems or applications. Various presently unforeseen or unanticipated alternatives, modifications, variations, or improvements therein may be subsequently made by those skilled in the art which are also intended to be encompassed by the following claims. Unless specifically defined in a specific claim itself, steps or components of the systems and methods herein cannot be implied or imported from any above example as limitations to any particular order, number, position, size, shape, angle, color, or material.

What is claimed is:

1. A method comprising:
  receiving a continuous electronic data stream of unlabeled data instances;
  automatically feeding said unlabeled data instances into a stream-based selection strategy and a pool-based selection strategy;
  automatically continuously applying said stream-based selection strategy to each of said unlabeled data instances to continually select stream-based data instances by performing an incremental computerized selection processes that selects ones of said unlabeled data instances based on human annotation criteria, incrementally as each unlabeled data instance is received;
  automatically storing said stream-based data instances in an electronic storage element;
  automatically periodically applying said pool-based selection strategy to a pool of data obtained from said unlabeled data instances to periodically select pool-based data instances by performing a batch computerized selection processes that selects ones of said unlabeled data instances based on human annotation criteria, from all unlabeled data instances in said electronic storage element;
  each time said pool-based selection strategy is applied, automatically replacing ones of said stream-based data instances in said electronic storage element with said pool-based data instances;
  providing, on demand, access to said electronic storage element to annotate ones of said stream-based data instances and said pool-based data instances currently maintained by said electronic storage element at a time when a user accesses said electronic storage element;
  receiving annotations relating to said stream-based data instances and said pool-based data instances from said user to produce annotated data instances; and
  automatically training a previous model with said annotated data instances to produce an updated model by updating said previous model using labels said annotations provide.

2. The method according to claim 1, further comprising updating a classification confidence threshold used by said stream-based selection strategy based on classification confidence values produced during said applying said pool-based selection strategy.

3. The method according to claim 1, said providing, on demand, access to said electronic storage element to annotate ones of said stream-based data instances and said pool-based data instances at unpredictable times.

4. The method according to claim 1, said stream-based selection strategy and said pool-based selection strategy having independent selection criteria.

5. The method according to claim 1, said the pool-based selection strategy and said the stream-based selection strategy automatically making decisions as to whether said unlabeled data instances should be annotated by said user.

6. The method according to claim 1, said stream-based selection strategy making a selection decision on every one of said unlabeled data instances, and said pool-based selection strategy evaluating and ranking said unlabeled data instances in said pool of data before making a selection decision.

7. The method according to claim 1, said stream-based selection strategy making lower quality selection relative to said pool-based selection strategy.

8. A method comprising:
  receiving a continuous electronic data stream of unlabeled data instances;
  automatically feeding said unlabeled data instances into a stream-based selection strategy and a pool-based selection strategy;
  automatically continuously applying said stream-based selection strategy to each of said unlabeled data instances to continually select stream-based data instances by performing an incremental computerized selection processes that selects ones of said unlabeled data instances based on human annotation criteria, incrementally as each unlabeled data instance is received;

automatically storing said stream-based data instances in an electronic storage element;

automatically periodically applying said pool-based selection strategy to a pool of data obtained from said unlabeled data instances to periodically select pool-based data instances by performing a batch computerized selection processes that selects ones of said unlabeled data instances based on human annotation criteria, from all unlabeled data instances in said electronic storage element;

each time said pool-based selection strategy is applied, automatically replacing ones of said stream-based data instances in said electronic storage element with said pool-based data instances;

providing, on demand, access to said electronic storage element to annotate ones of said stream-based data instances and said pool-based data instances currently maintained by said electronic storage element at a time when a user accesses said electronic storage element;

receiving annotations relating to said stream-based data instances and said pool-based data instances from said user to produce annotated data instances;

automatically training a previous model with said annotated data instances to produce an updated model by updating said previous model using labels said annotations provide;

automatically replacing said previous model with said updated model; and automatically labeling said unlabeled data instances using said updated model.

9. The method according to claim 8, further comprising updating a classification confidence threshold used by said stream-based selection strategy based on classification confidence values produced during said applying said pool-based selection strategy.

10. The method according to claim 8, said providing, on demand, access to said electronic storage element to annotate ones of said stream-based data instances and said pool-based data instances at unpredictable times.

11. The method according to claim 8, said stream-based selection strategy and said pool-based selection strategy having independent selection criteria.

12. The method according to claim 8, said the pool-based selection strategy and said the stream-based selection strategy automatically making decisions as to whether said unlabeled data instances should be annotated by said user.

13. The method according to claim 8, said stream-based selection strategy making a selection decision on every one of said unlabeled data instances, and said pool-based selection strategy evaluating and ranking said unlabeled data instances in said pool of data before making a selection decision.

14. The method according to claim 8, said stream-based selection strategy making lower quality selection relative to said pool-based selection strategy.

15. A system comprising:
an input receiving a continuous electronic data stream of unlabeled data instances;
a first processing element operatively connected to said input, said first processing element automatically and continuously applying a stream-based selection strategy to each of said unlabeled data instances to continually select stream-based data instances by performing an incremental computerized selection processes that selects ones of said unlabeled data instances based on human annotation criteria, incrementally as each unlabeled data instance is received;

an electronic storage element operatively connected to said first processing element, said electronic storage element storing said stream-based data instances;

a second processing element operatively connected to said input and said electronic storage element, said second processing element automatically and periodically applying a pool-based selection strategy to a pool of data obtained from said unlabeled data instances to periodically select pool-based data instances by performing a batch computerized selection processes that selects ones of said unlabeled data instances based on human annotation criteria, from all unlabeled data instances in said electronic storage element, said second processing element automatically replaces ones of said stream-based data instances in said electronic storage element with said pool-based data instances;

a graphic user interface operatively connected to said electronic storage element, said graphic user interface providing, on demand, access to said electronic storage element to annotate ones of said stream-based data instances and said pool-based data instances currently maintained by said electronic storage element at a time when a user accesses said electronic storage element, and said graphic user interface receiving annotations relating to said stream-based data instances and said pool-based data instances from said user to produce annotated data instances; and a third processing element operatively connected to said graphic user interface, said third processing element automatically training a previous model with said annotated data instances to produce an updated model by updating said previous model using labels said annotations provide, said third processing element automatically replacing said previous model with said updated model, and said third processing element automatically labeling said unlabeled data instances using said updated model.

16. The system according to claim 15, said third processing element automatically updating a classification confidence threshold used by said stream-based selection strategy based on classification confidence values produced during said applying said pool-based selection strategy.

17. The system according to claim 15, said graphic user interface providing, on demand, access to said electronic storage element to allow said user to annotate ones of said stream-based data instances and said pool-based data instances at unpredictable times.

18. The system according to claim 15, said stream-based selection strategy and said pool-based selection strategy having independent selection criteria.

19. The system according to claim 15, said the pool-based selection strategy and said the stream-based selection strategy automatically making decisions as to whether said unlabeled data instances should be annotated by said user.

20. The system according to claim 15, said stream-based selection strategy making a selection decision on every one of said unlabeled data instances, and said pool-based selection strategy evaluating and ranking said unlabeled data instances in said pool of data before making a selection decision.

* * * * *